(12) United States Patent  
Ogrizek et al.

(10) Patent No.: US 8,011,824 B2
(45) Date of Patent: Sep. 6, 2011

(54) ROD MIXER COMPRISING A PLATE SUPPORT

(75) Inventors: Darko Ogrizek, Velenje (SI); Toni Pogacar, Sempeter (SI); Aleksander Sedovsek, Mozirje (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 886 days.

(21) Appl. No.: 11/660,686

(22) PCT Filed: Aug. 9, 2005

(86) PCT No.: PCT/EP2005/053916
§ 371 (c)(1),
(2), (4) Date: Feb. 20, 2007

(87) PCT Pub. No.: WO2006/024593
PCT Pub. Date: Mar. 9, 2006

(65) Prior Publication Data
US 2007/0280037 A1 Dec. 6, 2007

(30) Foreign Application Priority Data
Aug. 31, 2004 (DE) .......................... 10 2004 042 087

(51) Int. Cl.
*A47J 43/08* (2006.01)

(52) U.S. Cl. ........................................ 366/129; 366/601

(58) Field of Classification Search ................ 366/129, 366/601
See application file for complete search history.

(56) References Cited

U.S. PATENT DOCUMENTS

| 4,850,699 | A | * | 7/1989 | Rebordosa | .................... 366/129 |
| 5,522,659 | A | * | 6/1996 | Penaranda et al. | ............ 366/129 |
| 6,234,663 | B1 | | 5/2001 | Lecerf et al. | |
| 2003/0066437 | A1 | | 4/2003 | Pavlovic et al. | |
| 2003/0070564 | A1 | | 4/2003 | Pavlovic et al. | |
| 2003/0198124 | A1 | * | 10/2003 | Glucksman et al. | .......... 366/129 |

FOREIGN PATENT DOCUMENTS

| DE | 34 46 970 | 6/1986 |
| DE | 196 35 223 | 3/1998 |
| DE | 198 10 873 | 11/1998 |
| FR | 76.618 E | 3/1962 |
| FR | 2 758 073 | 7/1998 |
| WO | WO 02/03842 | 1/2002 |

* cited by examiner

Primary Examiner — David L Sorkin
(74) Attorney, Agent, or Firm — James E. Howard; Andre Pallapies

(57) ABSTRACT

A rod mixer comprising a motor which is used to drive a processing worktool, and which is in contact with an electric circuit board which comprises at least one electric component which is used to control the motor. Said component can be modified by an associated, hand-operated actuator. The circuit board is introduced into a holder which comprises at least one bearing point, wherein the actuator is guided. The aim of the invention is to simplify mounting of the rod mixer such that the at least one actuator is premounted on the holder.

9 Claims, 3 Drawing Sheets

ROD MIXER COMPRISING A PLATE SUPPORT

The invention relates to a rod mixer.

DE 37 09 573 A1 discloses a rod mixer which is provided with a moor arranged in a device housing part for driving a mixing bar, and can be assembled without screw and glued connections. For this purpose the individual components are arranged one underneath the other and are fitted with noses and projections for hooking or clipping into each other so that after all the parts have been assembled a fully assembled rod mixer is produced which is fully sealed all round its outer contour. In this case the motor is received in the device housing at the driven end by means of an elastically sprung bearing so that it is axially displaceable. A circuit board has two contact lugs which, together with the circuit board, can be slid into slotted openings provided on the motor for supplying power from above. The circuit board can be slid into a slotted opening of a bearing part which has wall parts on which are formed pins which engage in holes of a rocker switch. The disadvantage of this prior art is that the rocker switch is not applied to the pins until the bearing part has already been installed in the bearing housing. This makes it difficult to fit the rod mixer because the rocker switch has to be introduced through an opening in the device housing afterwards, i.e. after the bearing part and circuit board have been fitted, then engaged behind a rear wall of the housing part by means of a nose. The rocker switch is then supported on the housing part in an operational end position.

The object of the invention is to facilitate the assembly of the rod mixer.

This object is achieved according to the invention in that the at least one actuator is premounted on the holder. Because of the premounting of the at least one actuator on the holder the actuator or elements can be secured operationally to the holder before the holder is inserted in the housing of the rod mixer. Here the functional unit, comprising the circuit board, electrical components and actuators, is assembled even before the final assembly of the device to the extent that this functional unit can be tested, for example, for its mechanical and/or electrical functionality. The insertion of the actuators in the bearing points can also be carried out more easily outside the device housing because all the components are more easily accessible without the device housing than would be the case if the holder and the circuit board were already installed in the device housing. This is particularly important in the case of housings of rod mixers which are normally designed relatively small in size.

The at least one actuator is preferably mounted adjustably on the holder between two operational limit positions determined by the holder. If a pressure switch is provided the limit positions are a position of rest, in which the switch is not actuated by the actuator, and a switching position in which the switch is actuated, the contacts of which switch are therefore closed. If a rotary potentiometer is provided, the limit positions are a first angular position of an adjusting wheel, in which the speed of the motor, for example, is at its lowest or zero, and a second angular position of the adjusting wheel in which the speed of the motor, for example, is at its maximum. Each of the limit positions can be predetermined by a stop provided on the actuator, which stop forces the actuator against the electrical contacts of the switch, which in turn press against the upper side of the circuit board and bear against it. The stop for the forced limit position may alternatively also be formed by a projecting shoulder on the actuator, for example, which shoulder bears against the bearing point in the forced limit position.

The holder may have a frame part provided on the underside of the circuit board on the conductor track side, which part supports a stopping means to which the circuit board is positively secured. The frame part is preferably adapted, at least to a large extent, to the outer contour of the circuit board, i.e. no projecting parts of the circuit board project from the contour of the frame part except in any case for the electrical contacts for connecting the motor. This largely prevents damage to the circuit board. Forces that may possibly result in damage are absorbed from the frame part. One or a plurality of stop hooks may be provided as stopping means, extending perpendicularly, for example, from the plane of the circuit board through holes in the circuit board. The stop hooks may also alternatively grip the circuit board laterally.

The at least one bearing point is preferably formed on an arm of the holder projecting from the plane of the circuit board. The projecting arm may extend from the frame part provided on the underside of the circuit board, on the conductor track side, to the upper side of the circuit board until it reaches a point above the associated electrical component. This provides a highly compact design for the frame part. Each of the bearing points may be brought as close as possible to the electrical component so that the associated actuator may be as small as possible, i.e. compact. Because of the compact design of the functional unit, consisting of the circuit board, electrical components and actuators, can be inserted in the device housing of the rod mixer more easily.

The electrical component may be a switch, which can be switched by pressing a preferably pin-type actuator guided axially displaceably in a first bearing point of the holder. Here the first bearing point forms a bearing pillow block, which is constructed in the manner of a hub, in which the inserted actuator can be pushed backwards and forwards. Sine the circuit board is rigidly connected to the holder and the bearing points are also rigidly connected to the holder, distinct, non-adjustable positioning is guaranteed between the bearing points and the associated electrical components. One end of the axially displaceable pin-type actuator will therefore always strike precisely against the electrical contacts of the associated switch. This assignment of positions is already established after the premounting of the functional unit comprising the circuit board, holder, electrical contacts and actuators, and cannot be altered by the final assembly in the device housing of the rod mixer. Any incorrect positions may easily be detected outside the device housing and corrected before the functional unit is installed in the device housing. This facility reduces the probability of errors in rod mixers that are fully assembled and possibly already delivered, thereby improving production quality.

To prevent undesirable and/or undetermined rotation of the pin-type actuator about its axial extension, the pin-type actuator may, for example, have a T-shaped cross-section. Here the bearing point may be constructed in the manner of a hub adapted to the T-shaped cross-section of the actuator. The T-shaped cross-section provides the actuator with maximum stiffness with minimal consumption of material. Instead f the T-shaped cross-section the actuator may also have any other suitable cross-sectional shape that prevents the actuator from rotating about its axial extension but permits an axial movement. For this purpose the cross-section may be square, rectangular, triangular or star-shaped, for example. Preventing the actuator from twisting is particularly advantageous when an actuating surface is provided on the actuator, connected to it or formed on it, which surface has a shape that deviates from the circular shape and can be installed in the device housing adapted to the angular position.

For automatic return of the actuator to its position of rest a spring element can be provided between the first bearing point and the actuating surface of the actuator. The spring element may, for example, also be formed on the actuator in the injection moulding process. However, a separate spring element is preferably provided which is kept inserted between the actuator and the bearing point. If a pin-type actuator is provided, the separate spring element may be a spring coil which is pushed axially onto a shaft section of the pin-type actuator. One end of the spring element may be supported on a holding section on the actuator. This holding section may then preferably be positioned on the actuating surface. The second end of the spring element may alternatively be supported directly on the holder or on the bearing point.

To prevent the pin-type actuator from moving beyond its position of rest a stop means, bearing against the first bearing point, may be provided on the pin-type actuator. The stop means is preferably provided at one end of the actuator opposing the actuating surface. The stop means is preferably provided on the end face of the actuator. It may, for example, have two opposing stop noses whose free ends may pivot into recesses that are open on the edge on the switching section of the pin-type actuator, under spring preloading. An actuator fitted with such stop noses can be easily assembled. First the spring coil is pushed onto the shaft section of the actuator, then the actuator is inserted in the bearing point in its direction of actuation. Whilst the shaft section of the actuator is being inserted, the stop noses are pivoted during insertion in the bearing point are pivoted inwardly into the recesses of the pin-type actuator that are open on the edge so that the shaft section can be fully inserted in the bearing point until the stop noses are again able to expand again after passing the bearing point. The spring element now pre-clamps the actuator into its position of rest. Here the stop noses bear against the underside of the bearing point so that the actuator cannot be moved out of the bearing point.

If the electrical component is a rotary potentiometer the actuator may be an adjusting wheel which adjusts the rotary potentiometer by rotating. For this purpose the adjusting wheel is rotatably mounted in a second bearing point of the holder. The adjusting wheel may preferably have a bearing neck which rests in a second bearing point having the shape of a half-shell. In an extension of the bearing neck an adjusting shaft modifying the rotary potentiometer is connected to the adjusting wheel. The circular segment is then designed so that it has at least the size corresponding to the desired adjusting angle over which the rotary potentiometer is to be adjustable. In other words, if the adjusting angle is to be 180°, for example, the adjusting wheel should be designed so that it at least has the shape of a half-shell. A bearing neck is provided in the centre of the adjusting wheel perpendicular to the plane of the adjusting wheel, i.e. on the end side. The bearing neck can be inserted in a shell-shaped second bearing point. If the second bearing point is designed so that it is radially open and the bearing point, for example, is designed so that it surrounds the bearing neck over an angle exceeding 180°, the bearing neck and hence the adjusting wheel can be clipped in by radially pressing the bearing neck into the second bearing point. An adjusting shaft, which adjusts the rotary potentiometer, can be provided at one end of the bearing neck opposite the adjusting wheel. For this purpose a coupling pin, which can be inserted in a rotary hub part of the rotary potentiometer, is formed on one end of the adjusting shaft opposite the bearing neck.

The functional unit according to the invention, comprising the circuit board, holder, bearing points and actuators, is preferably used for rod mixers, but may also be used in other domestic appliances such as kitchen appliances, in the same or similar manner. The functional unit according to the invention is particularly advantageous when a very small installation space is available in the device housing.

A preferred exemplary embodiment of the invention is explained in greater detail in the following with reference to FIGS. 1 to 3.

Figure 1:
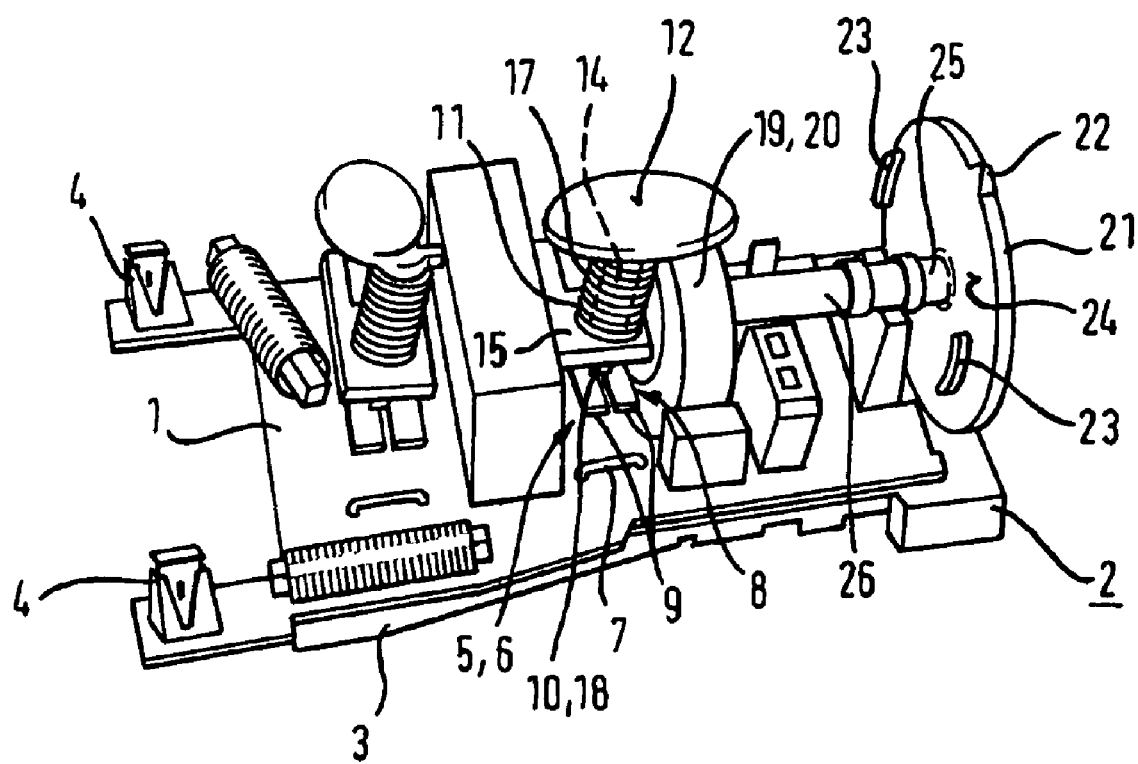
FIG. 1 shows a perspective view of a functional unit according to the invention comprising a circuit board, holder, bearing points and actuators.

A functional unit according to the invention is shown in FIG. 1. A circuit board 1 is clipped onto a holder 2 by a stop means 13 formed on a frame part 3. Holder 2 is connected to a frame section 3, which has an essentially rectangular shape and is adapted to the contour of circuit board 1. Two contact shoes 4 are provided on one lower end of circuit board 1 for connecting a motor. The circuit board has a first electrical component 5. Electrical component 5 is designed as a switch 6. A bright piece of wire 7 with an electrical connection of a conductor track is in electrical contact with the underside of circuit board 1 to form switch 6. A contact spring 8 associated with the piece of wire 7 forms the second contact of switch 6. Contact spring 8 carries two spring tongues 9 which are separated by a slot are electrically connected to each other. Spring tongues 9 are actuated by a free end 10 of a pin-type actuator 11 located on the end side. An actuating surface 12 is provided at one end that opposes the free end of pin-type actuator 11. Pin-type actuator 11 has a shaft section 14 which is inserted in a first bearing point 15.

Figure 2:
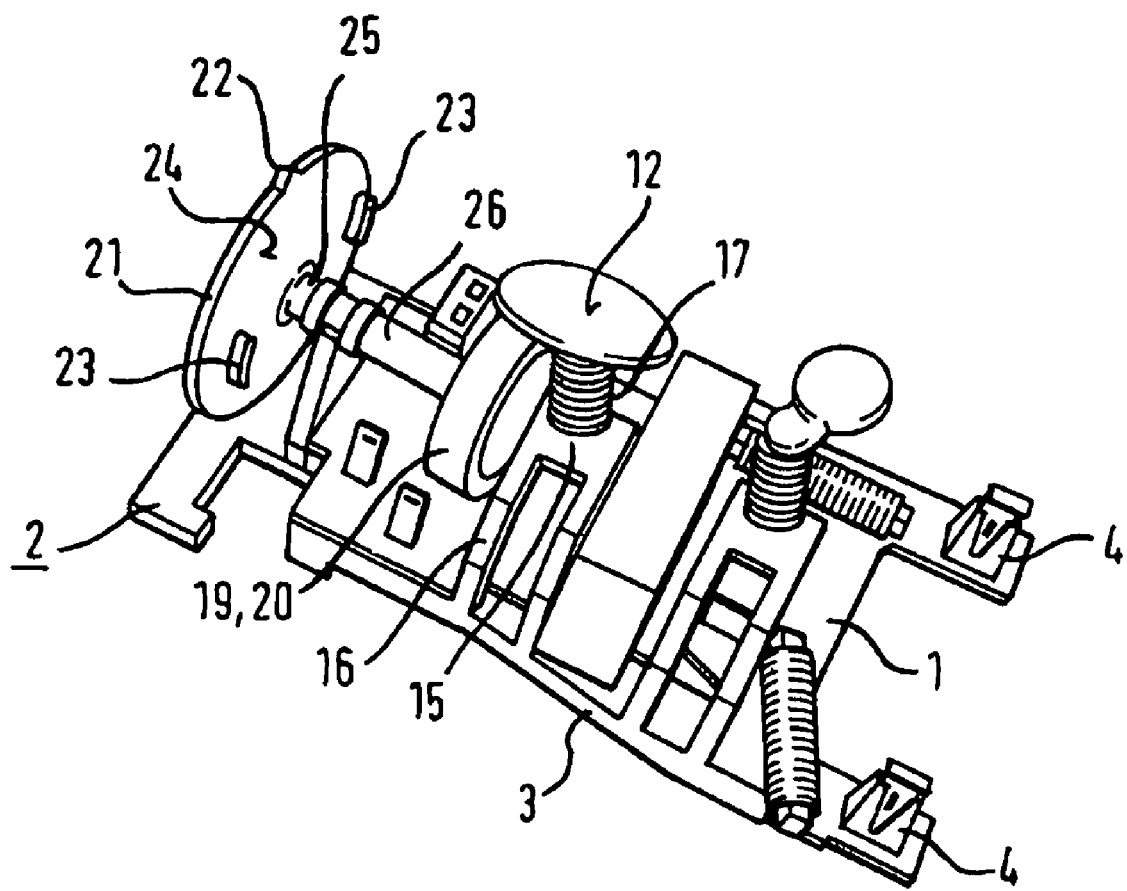
FIG. 2 shows the functional unit according to the invention from FIG. 1 in a second perspective view.

As shown in FIG. 2, bearing point 15 is formed on an arm 16 of holder 2 projecting from the plane of holder 2. Arm 16 comprises two web sections running parallel to each other at a certain distance from each other. A spring element 17, designed as a spring coil, is inserted between bearing point 15 and actuating surface 12. To prevent pin-type actuator 11 from being ejected upwards from first bearing point 15 by the spring coil, a stop means 18 is formed on the free end 10 of shaft section 14.

A second electrical component 19 is formed by a rotary potentiometer 20. An adjusting wheel 21 is provided for adjusting rotary potentiometer 20. Adjusting wheel 21 carries a pointer 22 for indicating the current angular position of adjusting wheel 21. Two stop noses 23, which delimit the pivoting angle of adjusting wheel 21, are provided on an underside of adjusting wheel 21, i.e. they determine the limit positions between which the actuator is adjustable. A bearing neck 25 is formed on one end side 24 of adjusting wheel 21. Bearing neck 25 rests in a second bearing point 26 of holder 2. In an extension of bearing neck 25 an adjusting shaft 26 is connected to adjusting wheel 21.

Figure 3:
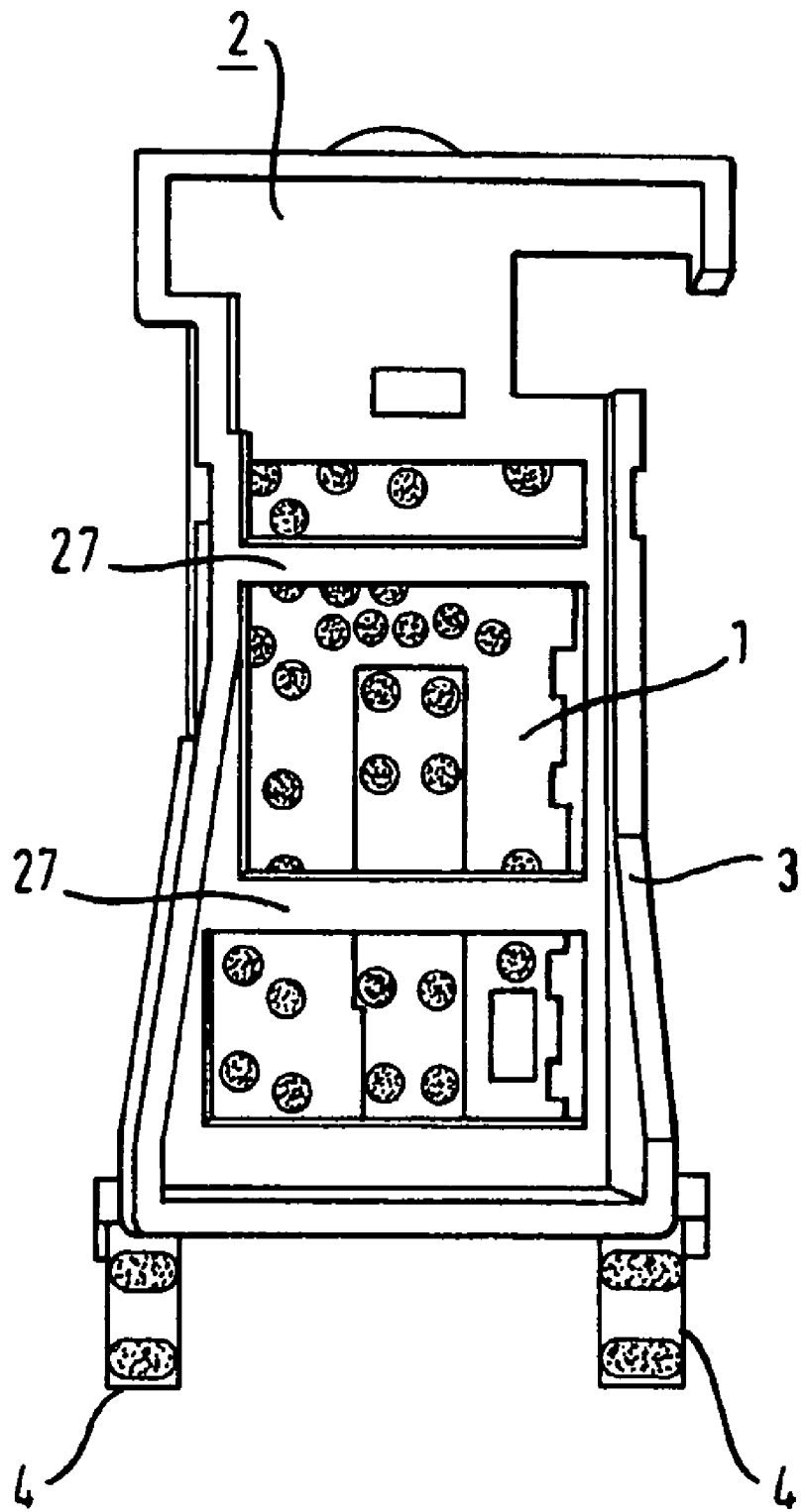
FIG. 3 shows the functional unit according to the invention from FIGS. 1 and 2, in a view from below.

FIG. 3 shows the functional unit from the underside of circuit board 1. Holder 2 comprises frame part 3 to which circuit board 1 is secured. Frame part 3 is approximately rectangular in shape and are stiffened by two cross braces 27.

The invention claimed is:
1. A rod mixer, comprising:
a motor for driving a processing tool;
an electric circuit board in contact with the motor, the electric circuit board including at least one electric component for controlling the motor;
at least one hand-operated actuator structured to actuate the at least one electric component;

a holder structured to hold the electric circuit board and including at least one bearing point wherein the at least one actuator is guided, and wherein the at least one actuator is premounted on the holder, wherein the holder has a frame part provided on an underside of the circuit board on a conductor track side, which frame part supports a stop means to which the circuit board is positively secured, wherein the at least one bearing point is formed on an arm of the holder projecting from the plane of the circuit board, and wherein a first of the at least one electrical component is a rotary potentiometer which can be adjusted by rotating an adjusting wheel which is rotatably mounted in a second bearing point of the holder.

2. The rod mixer according to claim 1, wherein the at least one actuator is mounted adjustably on the holder between two operational limit positions determined by the holder.

3. The rod mixer according to claim 1, wherein the projecting arm extends from the frame part provided on the underside of the circuit board on the conductor track side, to the upper side of the circuit board as far as a position above an associated electric component.

4. The rod mixer according to claim 1, wherein the at least one actuator is a pin-type actuator, and a second of the at least one the electric component is a switch which can be switched by pressing the pin-type actuator which is guided axially displaceably in a first bearing point of the holder.

5. The rod mixer according to claim 4, wherein the pin-type actuator has a T-shaped cross-section.

6. The rod mixer according to claim 4, wherein a spring element is provided between the first bearing point of the holder and an actuating surface of the pin-type actuator for automatic return of the pin-type actuator to its position of rest.

7. The rod mixer according to claim 6, wherein a stop means bearing against the first bearing point is provided on the pin-type actuator to prevent the pin-type actuator from moving beyond its position of rest.

8. The rod mixer according to claim 1, wherein the adjusting wheel has a bearing neck which rests in a second bearing point having the shape of a half-shell.

9. The rod mixer according to claim 8, wherein in an extension of the bearing neck an adjusting shaft modifying the rotary potentiometer is connected to the adjusting wheel.

\* \* \* \* \*